US009883555B2

(12) United States Patent
Deng et al.

(10) Patent No.: US 9,883,555 B2
(45) Date of Patent: Jan. 30, 2018

(54) BALLAST-COMPATIBLE LIGHTING DRIVER AND LIGHT EMITTING DIODE LAMP COMPRISING THE SAME

(71) Applicant: DongGuan Pan American Electronics Co., Ltd., DongGuan (CN)

(72) Inventors: Jinsheng Deng, Dong Guan (CN); Xiaoyun Zeng, Dong Guan (CN)

(73) Assignee: DongGuan Pan American Electronics Co., Ltd., DongGuan (CN)

( * ) Notice: Subject to any disclaimer, the term of this patent is extended or adjusted under 35 U.S.C. 154(b) by 0 days.

(21) Appl. No.: 14/405,277

(22) PCT Filed: Oct. 17, 2014

(86) PCT No.: PCT/CN2014/088815
§ 371 (c)(1),
(2) Date: Dec. 3, 2014

(87) PCT Pub. No.: WO2016/058177
PCT Pub. Date: Apr. 21, 2016

(65) Prior Publication Data
US 2017/0215239 A1 Jul. 27, 2017

(51) Int. Cl.
*H05B 37/02* (2006.01)
*H05B 33/08* (2006.01)
(Continued)

(52) U.S. Cl.
CPC .......... *H05B 33/0815* (2013.01); *F21K 9/27* (2016.08); *F21V 23/003* (2013.01);
(Continued)

(58) Field of Classification Search
CPC ........... H05B 33/0815; H05B 33/0845; H05B 33/0839; F21V 23/003; F21V 23/06
(Continued)

(56) References Cited

U.S. PATENT DOCUMENTS 7,375,476 B2 5/2008 Walter et al.
8,648,543 B1* 2/2014 Fan ................. H05B 37/02
315/200 R
(Continued)

FOREIGN PATENT DOCUMENTS

AU 2006234972 A1 10/2006
CA 2603640 A1 10/2006
(Continued)

OTHER PUBLICATIONS

Notification of Transmittal of the International Search Report and the Written Opinion of the International Searching Authority, or the Declaration for International Application No. PCT/CN2014/088815; dated Jul. 15, 2015 (3 pgs.).
(Continued)

*Primary Examiner* — Thuy Vinh Tran
(74) *Attorney, Agent, or Firm* — Finnegan, Henderson, Farabow, Garrett, & Dunner LLP

(57) ABSTRACT

The present disclosure includes an apparatus, which includes: a transparent cover, a housing to form a first compartment with the transparent cover, one or more light emitting diodes disposed inside the first compartment, and a lighting driver module disposed inside the first compartment and electrically coupled with the one or more light emitting diodes, the lighting driver module including a rectifier to convert an AC signal to a DC signal, a current sensor to measure current supplied to the one or more light emitting diodes and to provide information related to the measured current, a first switching device electrically coupled with the rectifier and with the one or more light emitting diodes, and being capable of being controlled by a controller to interrupt or allow a transmission of the DC signal to the one or more light emitting diodes, based on the information provided by the current sensor.

16 Claims, 11 Drawing Sheets

(51) Int. Cl.
*F21K 9/27* (2016.01)
*F21Y 103/10* (2016.01)
*F21Y 115/10* (2016.01)
*F21V 23/00* (2015.01)

(52) U.S. Cl.
CPC ....... *F21Y 2103/10* (2016.08); *F21Y 2115/10* (2016.08); *H05B 33/0839* (2013.01); *H05B 33/0845* (2013.01)

(58) Field of Classification Search
USPC ........ 362/85, 311.01, 311.02, 362, 363, 367; 315/185 R, 209 R, 291, 307, 308
See application file for complete search history.

(56) References Cited

U.S. PATENT DOCUMENTS

| | | | |
|---|---|---|---|
| 8,669,934 | B2 | 3/2014 | Sasaki |
| 8,678,611 | B2 * | 3/2014 | Chu ..................... F21V 7/0008 313/110 |
| 8,915,610 | B2 | 12/2014 | Fujita et al. |
| 2006/0226795 | A1 | 10/2006 | Walter et al. |
| 2010/0207536 | A1 | 8/2010 | Burdalski et al. |
| 2011/0175536 | A1 | 7/2011 | Fujita et al. |
| 2012/0075544 | A1 | 3/2012 | Sasaki |
| 2012/0187864 | A1 * | 7/2012 | Iwai ..................... H05B 33/089 315/291 |
| 2013/0320869 | A1 | 12/2013 | Jans et al. |
| 2014/0009077 | A1 * | 1/2014 | Yoshimoto ......... H05B 33/0815 315/210 |
| 2015/0138773 | A1 | 5/2015 | Fujita et al. |

FOREIGN PATENT DOCUMENTS

| | | |
|---|---|---|
| CN | 101189917 A | 5/2008 |
| CN | 102119296 A | 7/2011 |
| CN | 202310187 U | 7/2012 |
| CN | 102119296 B | 6/2013 |
| CN | 103380658 A | 10/2013 |
| CN | 103748961 A | 4/2014 |
| CN | 203775484 U | 8/2014 |
| EP | 1867214 A1 | 12/2007 |
| EP | 2213144 A1 | 8/2010 |
| EP | 2676526 A1 | 12/2013 |
| JP | 2008538053 A | 10/2008 |
| JP | 2012059839 A | 3/2012 |
| JP | 2013258161 A | 12/2013 |
| JP | 5380451 B2 | 1/2014 |
| JP | 2014509053 A | 4/2014 |
| JP | 5671590 B2 | 2/2015 |
| JP | 2015092490 A | 5/2015 |
| MX | 2007012427 A | 12/2007 |
| RU | 2013142062 A | 3/2015 |
| TW | 201024596 A | 7/2010 |
| TW | 201240517 A | 10/2012 |
| WO | WO2006110340 A1 | 10/2006 |
| WO | WO2009055821 A1 | 4/2009 |
| WO | WO2010018682 A1 | 2/2010 |
| WO | WO2012110973 A1 | 8/2012 |

OTHER PUBLICATIONS

International Search Report for International Application No. PCT/CN2014/088815; dated Jul. 15, 2015 (5 pgs.).
Written Opinion of the International Searching Authority for International Application No. PCT/CN2014/088815; dated Jul. 15, 2015 (4 pgs.).
PCT International Preliminary Report on Patentability, Written Opinion dated Jul. 15, 2015, issued in corresponding International Application No. PCT/CN2014/088815 5 pages.
Official Communication, First Office Action, from the State Intellectual Property Office dated Jul. 5, 2017, issued in corresponding Chinese Application No. 201610682995.3 5 pages.

* cited by examiner

BALLAST-COMPATIBLE LIGHTING DRIVER AND LIGHT EMITTING DIODE LAMP COMPRISING THE SAME

TECHNICAL FIELD

The present disclosure relates to a LED lamp in general and, more particularly, to an LED lamp with a flexible lighting driver that works with and without a ballast.

BACKGROUND

A traditional fluorescent lamp generates a light by ionization of gas enclosed within the lamp, which allows a high electrical current to flow through the lamp. Typically a fluorescent lamp is connected with a ballast, which serves to limit the current flowing through the lamp. Without the ballast, a fluorescent lamp connected directly to a high voltage power source can rapidly and uncontrollably increase its current draw, which can then lead to overheating and eventual destruction of the lamp.

On the other hand, illumination devices based on semiconductor light sources, such as light-emitting diodes (LED), offer many advantages over traditional fluorescent lighting system, such as higher energy efficiency and longer expected lifetime. But LED requires a precise amount of a direct current ("DC") supply. This creates a problem when people try to reuse the existing fluorescent lighting fixture, which includes the socket for the lamp as well as the ballast. Simply replacing the fluorescent lamp with a LED lamp would not work, because the ballast may provide an alternating current ("AC") that is not precisely controlled to the LED lamp, due to various factors such as a ballast circuit design, a device variation, a voltage variation, temperature dependency, etc. As a result, typically LED lamps are not compatible with existing systems designed for fluorescent lights, and extra rewiring is needed to remove or to bypass the ballast, before the existing systems can be used for LED lamps. On the other hand, these LED lamps can be fully compatible with systems designed solely for LED lights that do not include ballast. However, for such a system, there is still a need to precisely control the current supplied to the LEDs within the lamps to control the intensity of light generated by the LEDs.

Therefore, there is a need for an LED lamp with a flexible lighting driver that works with and without a ballast, which allows easy retrofitting LED lamps into existing fluorescent lamp lighting fixtures as well as LED fixtures, while providing precise control of intensity of lights provided by the LED lamps.

SUMMARY

The present disclosure includes an apparatus. Embodiments of the apparatus includes: a transparent cover, a housing to form a first compartment with the transparent cover, one or more light emitting diodes disposed inside the first compartment, and a lighting driver module disposed inside the first compartment and electrically coupled with the one or more light emitting diodes. In some embodiments, the lighting driver module includes a rectifier to convert an AC signal to a DC signal, a current sensor configured to measure current supplied to the one or more light emitting diodes and to provide information related to the measured current, a first switching device electrically coupled with the rectifier and with the one or more light emitting diodes, and being capable of interrupting or allowing a transmission of the DC signal to the one or more light emitting diodes, and a controller to switch on or off the switching device to allow or interrupt, respectively, the transmission of the DC signal to the one or more light emitting diode, based on the information provided by the current sensor.

It is to be understood that both the foregoing general description and the following detailed description are exemplary and explanatory only and are not restrictive of the invention, as claimed.

BRIEF DESCRIPTION OF THE DRAWINGS

Reference will now be made to the accompanying drawings showing example embodiments of the present application, and in which.

DETAILED DESCRIPTION

Reference will now be made in detail to the exemplary embodiments, the examples of which are illustrated in the accompanying drawings. Whenever possible, the same reference numbers will be used throughout the drawings to refer to the same or like parts.

Note that in the corresponding drawings of the embodiments, signals are represented with lines. Some lines may be thicker, to indicate more constituent signal paths, and/or have arrows at one or more ends, to indicate primary information flow direction. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Figure 1A:
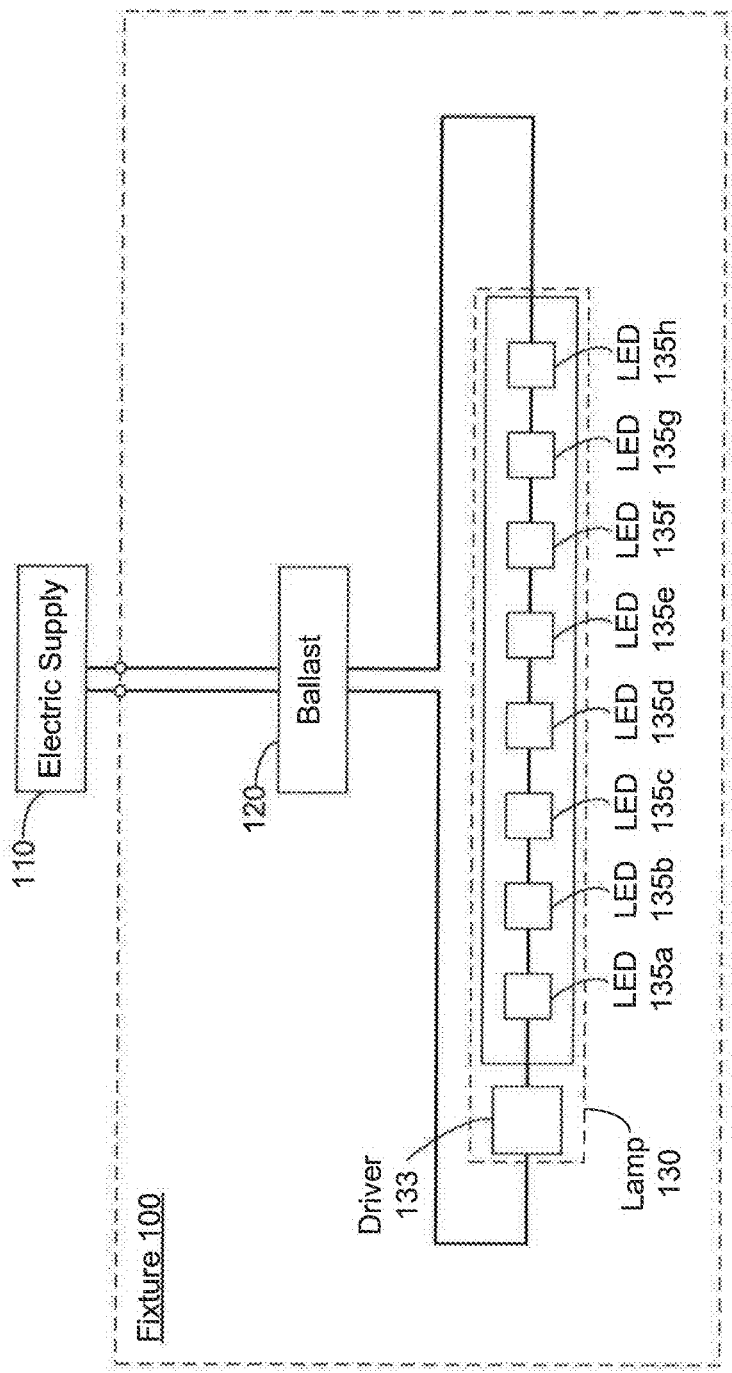
FIGS. 1A and 1B each illustrates a lighting fixture including an exemplary light emitting diode tube lamp, consistent with embodiments of the present disclosure.

FIG. 1A illustrates a lighting fixture 100 including an exemplary LED tube lamp 130, consistent with embodiments of the present disclosure. As shown in FIG. 1A, lighting fixture 100 is connected to an electric supply 110, from which lighting fixture 100 receives an alternating current ("AC") signal. Lighting fixture 100 further includes a ballast 120. Lighting fixture 100 can be used with a traditional fluorescent lamp, and ballast 120 can be used to, for example, limit the current supplied to the fluorescent lamp.

In FIG. 1A, however, an LED tube lamp 130, rather than a fluorescent lamp, is installed in lighting fixture 100 and receives an AC signal, with the current limited under a certain value, from ballast 120. LED tube lamp 130 includes an LED driver circuit 133, and one or more LED lights 135a-135h connected in series. LED driver circuit 133 receives the current-limited AC signal from ballast 120, and provides a direct-current ("DC") signal with a pre-determined amount of current to LED lights 135a-135h.

Figure 1B:
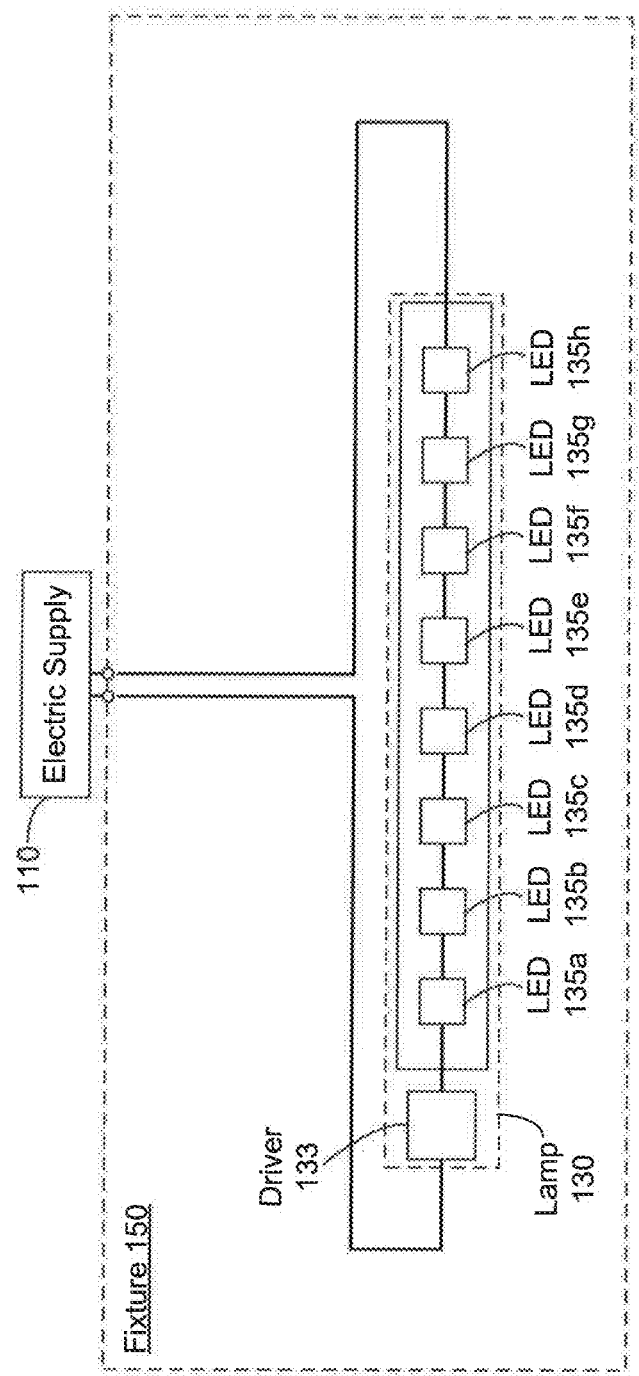

FIG. 1B illustrates a lighting fixture 150 including an exemplary LED tube lamp 130, consistent with embodiments of the present disclosure. As shown in FIG. 1B, lighting fixture 150 is connected to electric supply 110, from which lighting fixture 150 receives an AC signal. Unlike lighting fixture 100, however, lighting fixture 150 does not include a ballast, and may not be used for traditional fluorescent lamp. LED driver circuit 133 receives the AC signal from electric supply 110 without a ballast, and provides a DC signal with a pre-determined amount of current to LED lights 135a-135h.

Figure 2A:
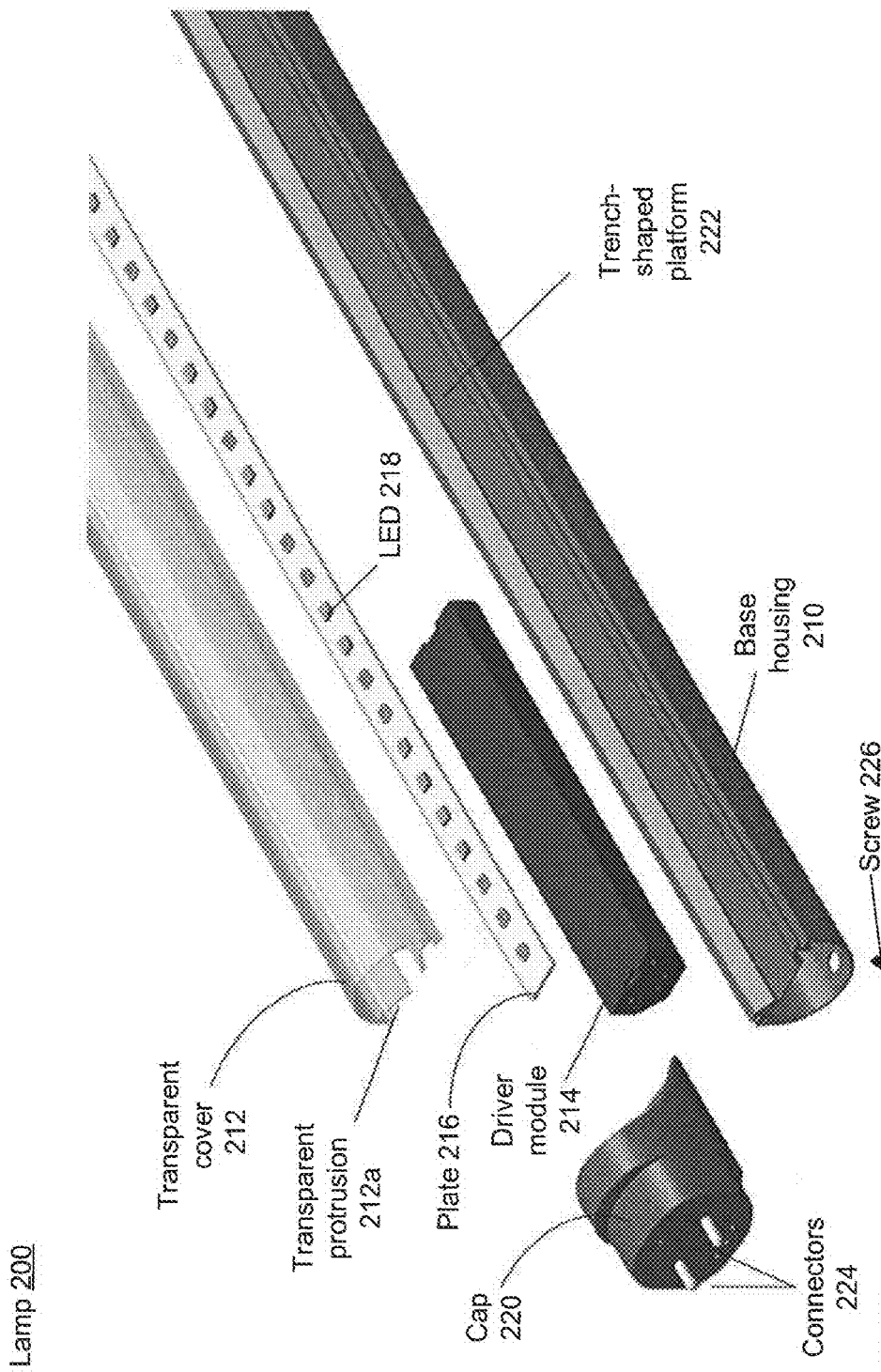
FIGS. 2A and 2B each is an explosive diagram illustrating an exemplary light emitting diode tube lamp, consistent with embodiments of the present disclosure.

FIG. 2A is an explosive diagram illustrating an exemplary light emitting diode tube lamp 200, consistent with embodiments of the present disclosure. As shown in FIG. 2A, LED tube lamp 200 includes a base housing 210, a transparent cover 212, a driver module 214, a supporting plate 216 on which one or more LED lights 218 are mounted, and one or more caps 220. Driver module 214 includes a lighting driver circuit to provide electrical currents to the LED lights, consistent with embodiments of the present disclosure, the detail of which will be discussed later.

Figure 2B:
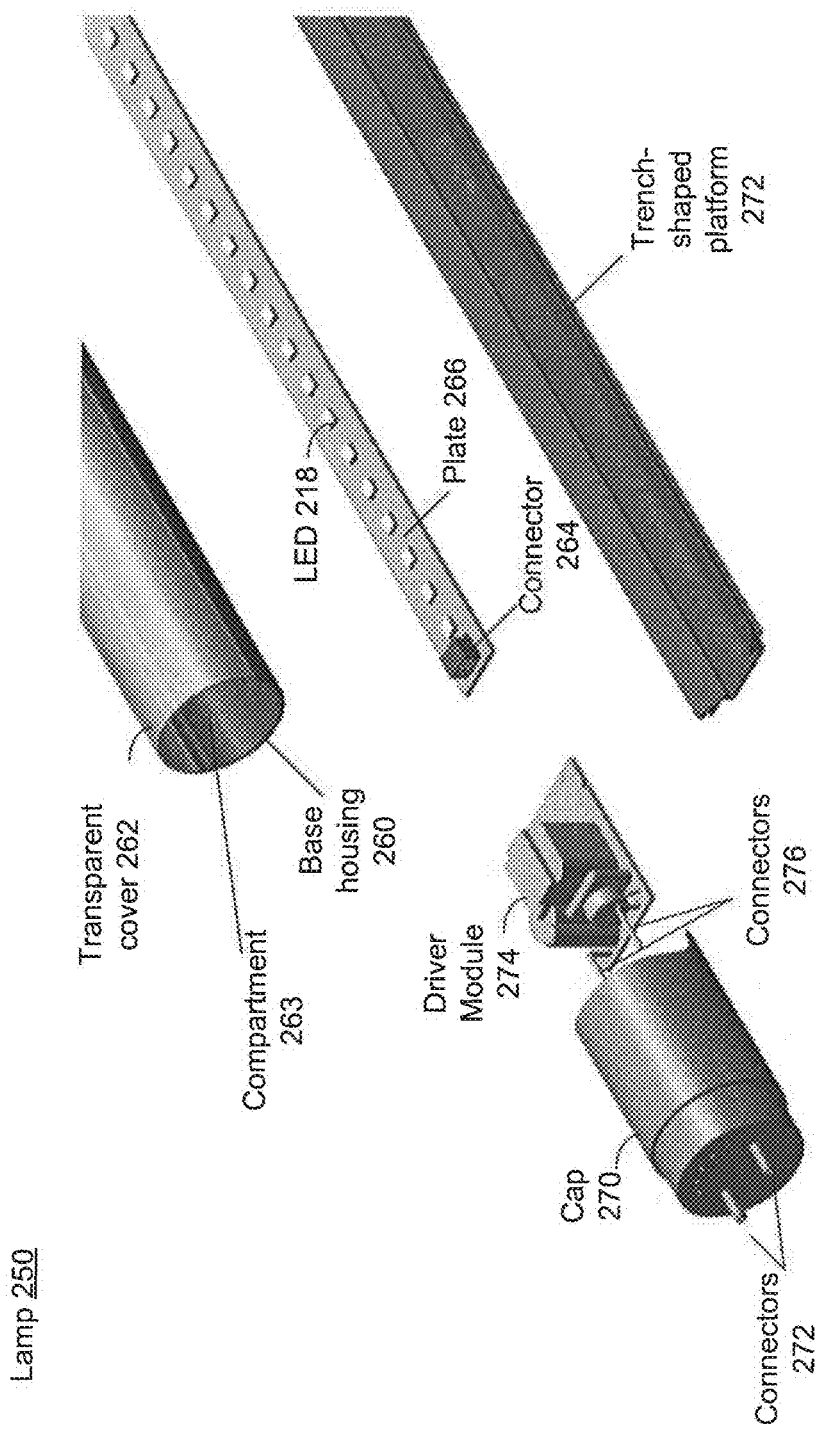
Figure 2C:
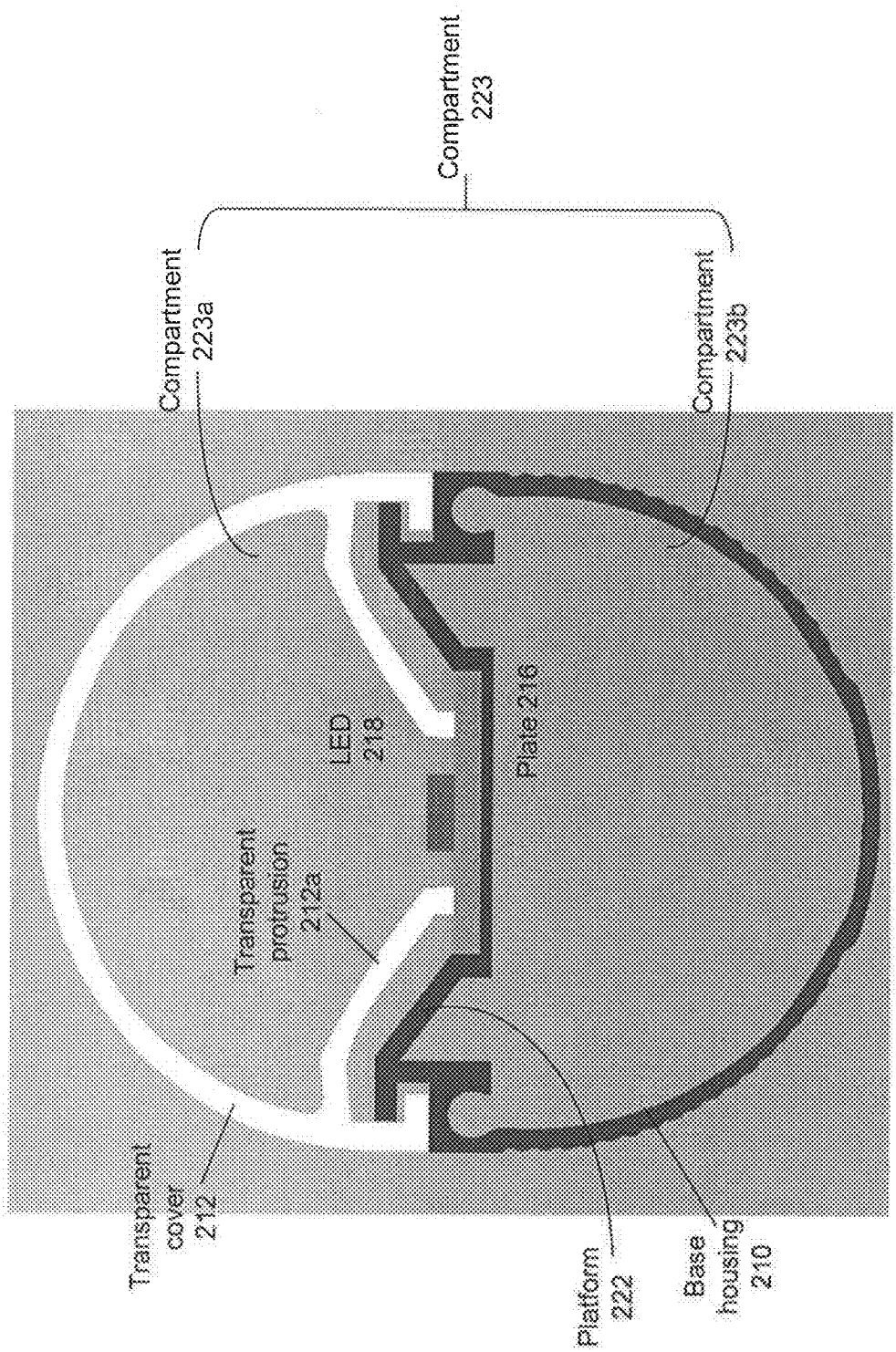
FIGS. 2C and 2D each is a cross-sectional diagram illustrating an exemplary light emitting diode tube lamp, consistent with embodiments of the present disclosure.

As shown in FIG. 2A, base housing 210 and transparent cover 212 form a compartment 223, with a platform 222 dividing compartment 223 into a top compartment 223a and a bottom compartment 223b as shown in FIG. 2C. Bottom compartment 223b can be used to accommodate driver module 214, while supporting plate 216 can be mounted on platform 222. In some embodiments, as shown in FIGS. 2A and 2C, platform 222 includes a trench, and supporting plate 216 can be mounted on the bottom of the trench of platform 222.

In some embodiments, at least one of platform 222 and base housing 210 can be made of a metal, or materials that have good thermal conductivity. Such an arrangement allows platform 222 (and/or with base housing 210) to conduct away, via supporting plate 216, the heat generated by LED lights 218, to provide cooling effect to the LED devices, and to extend the lifespan of the devices. In some embodiments, as shown in FIGS. 2A and 2C, transparent cover 212 further includes one or more transparent protrusion plate 212a. When transparent cover 212 forms compartment 223 with base holding 210, protrusion plate 212a can be adapted to press supporting plate 216 against platform 222, which can further improve the cooling effect of platform 222 upon LED lights 218.

In some embodiments, as shown in FIG. 2C, the compartments 223a and 223b formed by housing 210, transparent cover 212, and platform 222 may be in the shape of an ellipse, with LED light 218 posited slightly below the center of ellipse and away from the transparent cover. Such an arrangement can provide a benefit of minimizing internal reflection and maximizing the amount of light coming out of the LED tube lamp.

In some embodiments, supporting plate 216 includes a printed circuit board with wiring to provide electricity to the LED lights mounted on it. In some embodiments, supporting plate 216 includes hooks or latches (not shown in FIG. 2C) to detachably mount the LED lights, so that each LED light can be individually replaced.

Referring back to FIG. 2A, in some embodiments, cap 220 is configured to enclose one end of transparent cover 212 and one end of base housing 210, and to provide a structural support to hold them together. In some embodiments, a pair of caps 220 can be used to enclose both ends of transparent cover 212 and base housing 210. Cap 220 also includes connectors 224 which provide an electrical connection between, for example, electric supply 110 (or ballast 120) and driver module 214. In some embodiments, cap 220 may house a part of or the entirety of driver module 214. In some embodiments, cap 220 can further include a switch (not shown in FIG. 2A), which can interrupt or allow electric supply to driver module 214, and allow the lamp tube to be further isolated from electric supply during installation and testing, to enhance safety. In some embodiments, cap 220 can be screwed to base housing 210 via screw 226, to further strengthen the assembled structure of the lamp tube.

Figure 2D:
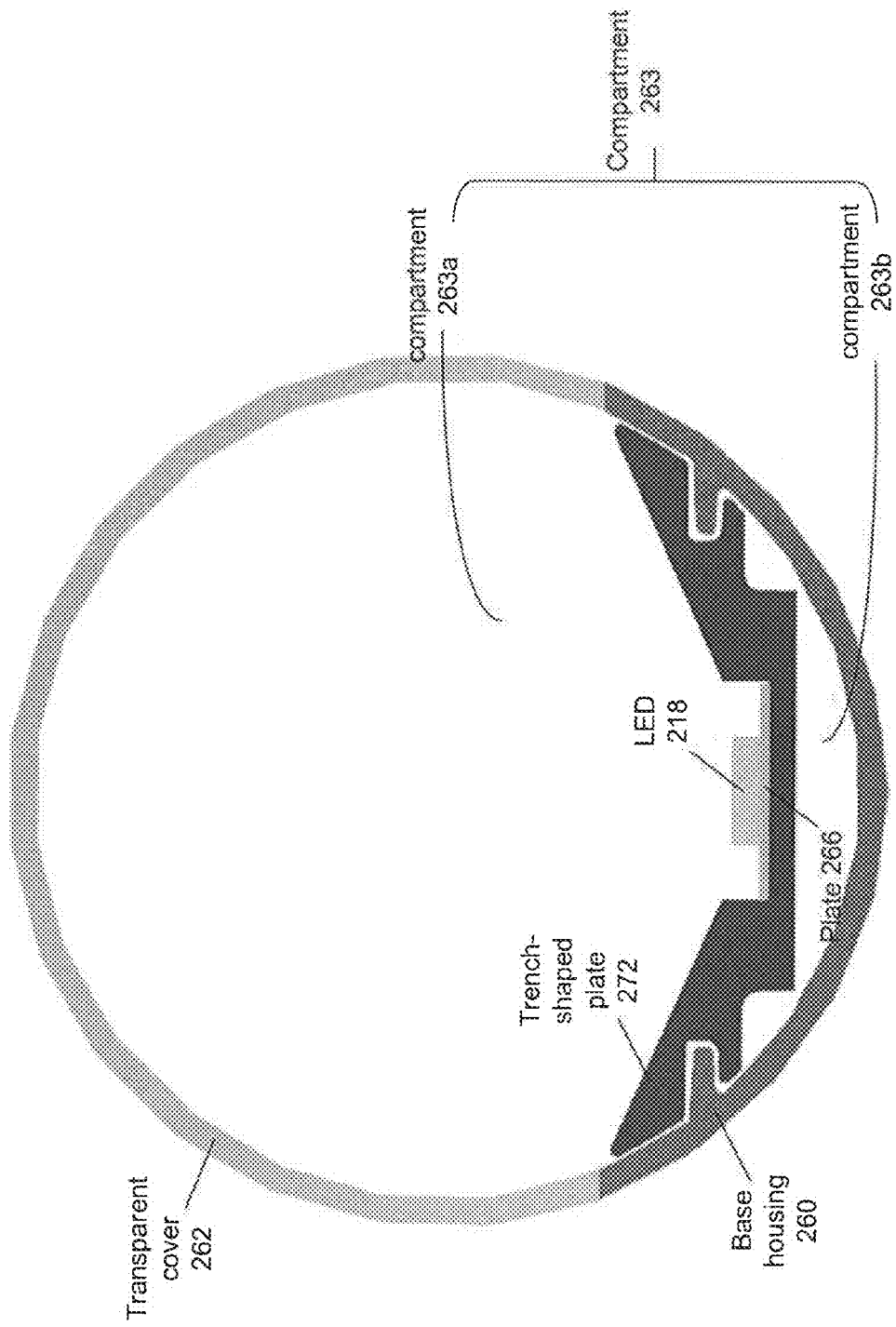

FIG. 2B is an explosive diagram illustrating an exemplary light emitting diode tube lamp 250, consistent with embodiments of the present disclosure. As shown in FIG. 2B, LED tube lamp 250 includes base housing 260 and transparent cover 262 forming a compartment 263. LED tube lamp 250 further includes a platform 272 to mount supporting plate 266. One or more LED lights 218 can be mounted on supporting plate 266, which further includes a connector 254 to receive electric current to be supplied to the LED lights. As shown in FIG. 2D, platform 272 can also divide compartment 263 into a top compartment 263a and a bottom compartment 263b, with platform 272 (and LED lights 218) posited below the center of compartment 263 and closer to the bottom of base housing 260, to minimize internal reflection and to maximize the amount of light coming out of the LED tube lamp.

Referring back to FIG. 2B, in some embodiments, LED Tube lamp 250 further includes cap 270 with one or more hollow connectors 272, and a driver module 274 with one or more connectors 276. Driver module 274 includes a lighting driver circuit to provide an electrical current to the LED lights, consistent with embodiments of the present disclosure, the detail of which will be discussed later. Similar to connectors 224 of FIG. 2A, hollow connectors 272 can also provide an electrical connection between, for example, electric supply 110 (or ballast 120) and driver module 274. Cap 270 can accommodate and hold driver module 274, with connectors 276 of driver module 274 fitted within the interior of hollow connectors 262. In some embodiments, connectors 276 can be welded to the interior of hollow connectors 272 to improve connectivity (and to reduce electrical resistance) between the connectors, and to further improve assembly efficiency.

Although a lamp tube is illustrated in FIGS. 2A-2D, a person with ordinary skill in the art will understand that a lamp can take in various shapes and is by no means limited to a tube shape.

Figure 2E:
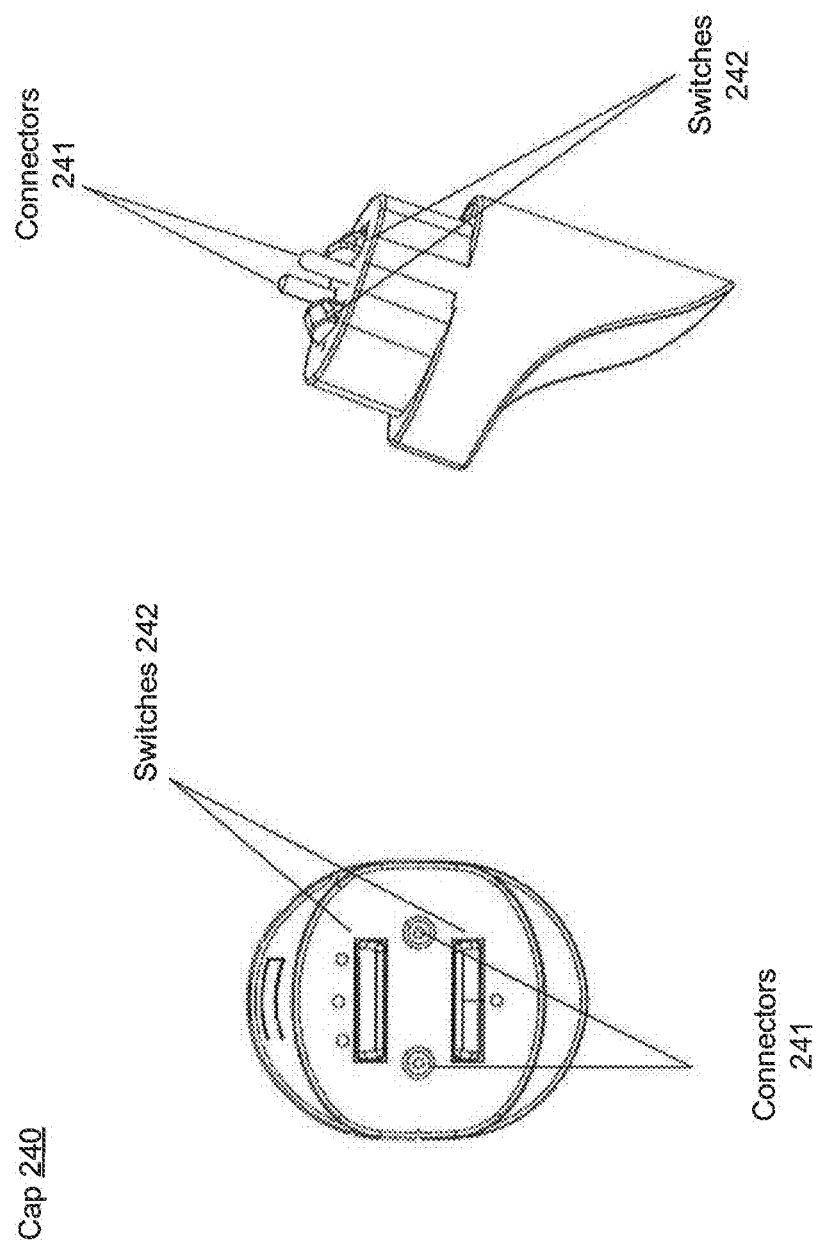
FIG. 2E illustrates two different views of an exemplary lamp cap, consistent with embodiments of the present disclosure.
Figure 3:
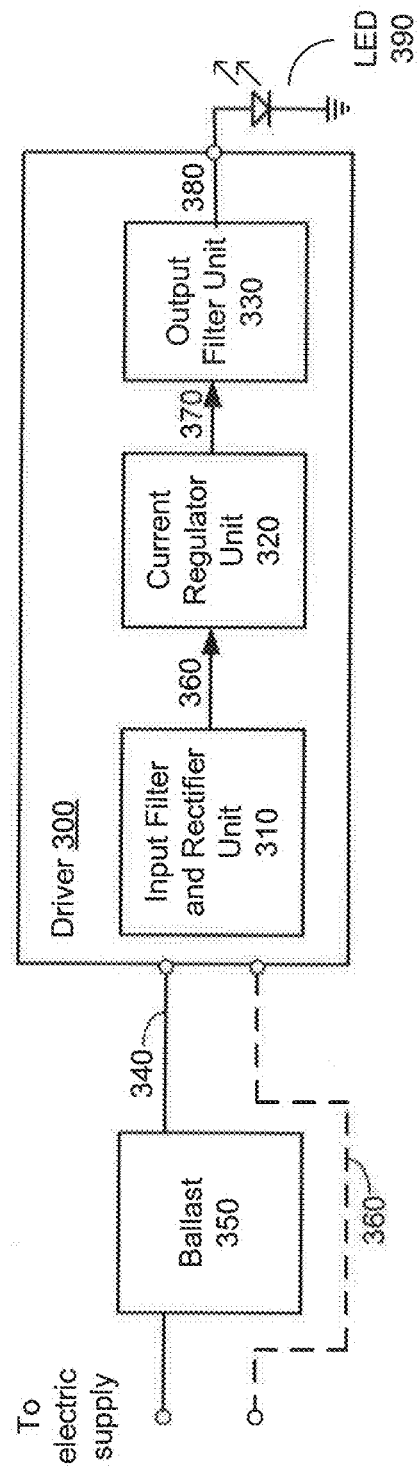
FIG. 3 is a block diagram illustrating an exemplary lighting driver, consistent with embodiments of the present disclosure.

FIG. 2E illustrates two different views of an exemplary lamp cap 240, consistent with embodiments of the present disclosure. In some embodiments, lamp cap 240 can be used in place of cap 220 in FIG. 2A, or cap 270 in FIG. 2B. As shown in FIG. 2E, cap 240 includes one or more connectors 241, which can operate similarly to connectors 224 of FIG. 2A (and connectors 272 of FIG. 2B) to provide electrical connection to the corresponding driver module. Cap 240 further includes one or more switches 242 which, in the embodiments as shown, can be turned on or off by pressing the switches. The switches can enable or disable the connection between connectors 241 and the driver module. Such an arrangement allows the lamp tube to be further isolated from electric supply during installation and testing, to enhance safety FIG. 3 is a block diagram illustrating an exemplary lighting driver 300, consistent with embodiments of the present disclosure. As shown in FIG. 3, lighting driver 300 includes an input filter and rectifier unit 310, a current regulator unit 320, and an output filter unit 330. In FIG. 3 lighting driver 300 connects, via a wire 340, to a ballast 350, which then connects to an electric supply (not shown in FIG. 3). Alternatively, lighting driver 300 can also connect directly to the electric supply via wire 360. After receiving an AC signal from either ballast 350 or directly from the electric supply, input filter and rectifier unit 310 can rectify and convert the AC signal into a DC signal, and to filter the DC signal to further stabilize it. Unit 310 can then provide a stabilized DC signal 360 to current regulator unit 320, which can generate, from DC signal 370, a DC signal 380 which carries a current. Current regulator unit 320 can also include a feedback mechanism, where the current of DC signal 380 is monitored, and DC signal 380 can be adjusted so that its current is maintained at a pre-determined level. Output filter unit 330 can further stabilize DC signal 380 and provide it to one or more LEDs 390.

Figure 4:
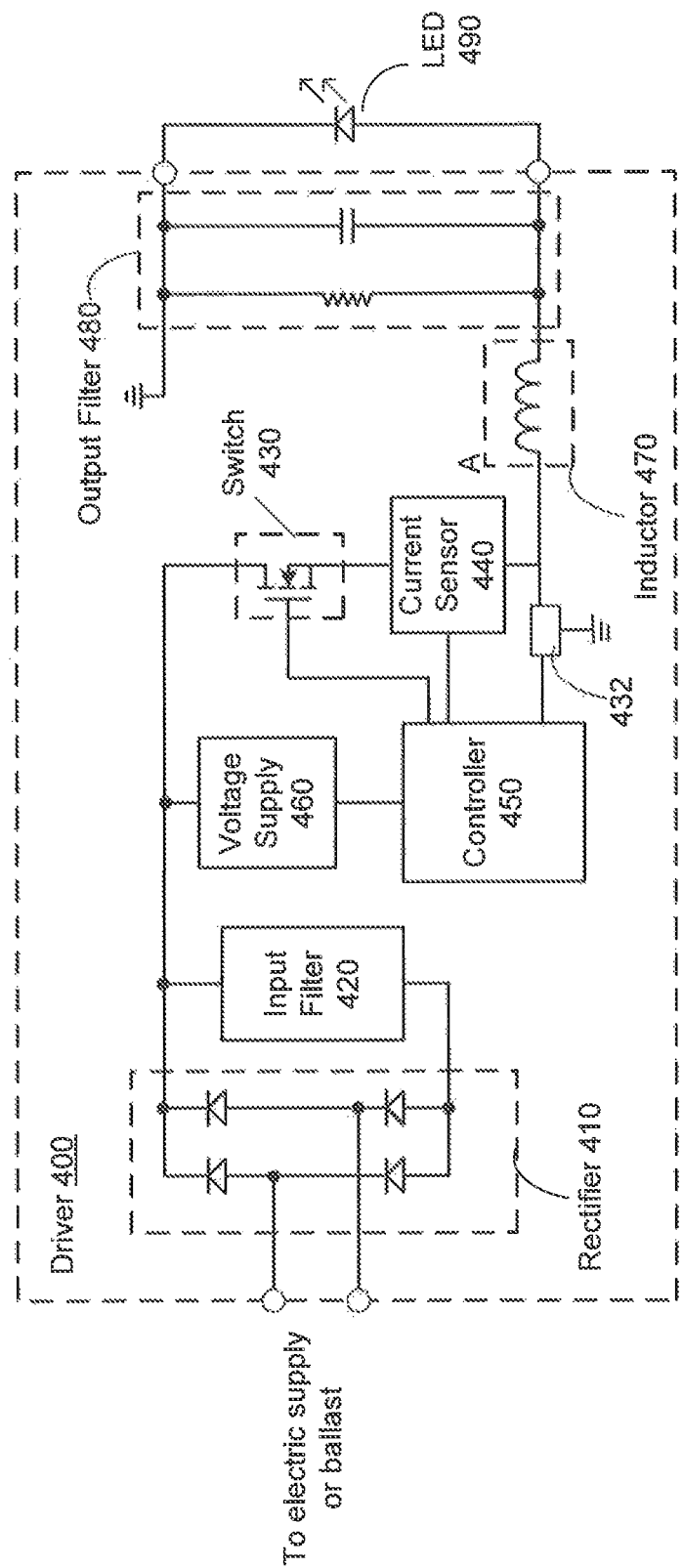
FIG. 4 is a detailed diagram illustrating an exemplary lighting driver, consistent with embodiments of the present disclosure.

FIG. 4 is a detailed diagram illustrating an exemplary lighting driver 400, consistent with embodiments of the present disclosure. Lighting driver 400 includes a rectifier 410, an input filter 420, a switching device 430, a current sensor 440, a controller 450, a voltage supply 460, an inductor 470, and an output filter 480 that includes a resistor and a capacitor connected in parallel. In some embodiments, switching device 430 is a field effect transistor (FET), but other appropriate switching devices may be employed instead. Controller 450 may include one or more application-specific integrated circuits (ASIC) or field programmable gate arrays (FPGAs), and peripheral circuits such as transceiver, receiver, A/D converter, etc. Current sensor 440 may include a resistor along the current path to convert the current into a voltage measurement, and the voltage measurement can be used by controller 450 to monitor the current going through current sensor 440.

Lighting driver 400 receives an AC input from either a ballast or directly from an electric supply, and outputs a DC signal to LED 490. Upon receiving the AC input, rectifier 410 can be used to rectify the AC input to convert it to a DC signal. In some embodiments, as shown in FIG. 4, rectifier 410 includes a diode bridge to perform full-wave rectification. In some embodiments, rectifier 410 can further include capacitors and inductors (not shown in FIG. 4) to filter the input signal before entering the diode bridge. Following rectification, input filter 420 can be used to further filter the rectified DC signal. Various topologies of input filter can be employed, such as a π-filter, T-filter, L-filter, or biquad filter, can be used. In some embodiments, active electronic components such as operational amplifier can be used to implement the filter. A person with ordinary skill in the art will appreciate that the above-listed options for input filter topology is for illustration only and do not represent all the options available for the implementation of input filter 420.

The filtered and rectified DC signal can then be provided to voltage supply 460, which can be used to generate a supply voltage, from the DC signal, to controller 450. In some embodiments, controller 450 may operate at a much lower voltage than the rectified DC signal (which can be at 110 V in United States or at 220 V in other countries). In these embodiments, voltage supply 460 can include one or more resistors to introduce a voltage drop to the DC signal before being supplying it to controller 450. During the operation, controller 450 can first turn on switch 430, which can allow the DC signal to reach and go through inductor 470. During the time when the switch is turned on, a current, which comes with the DC signal, can move through current sensor 440. As the inductor experiences an increase of current, magnetic energy can build up in the inductor, and the amount of magnetic energy stored in the inductor can depend on the amount of time the switch is turned on. The current can then move through the inductor, filtered by output filter 480, and then supplies to LED 490.

Current sensor 440 can measure the current going through the inductor, and can provide the measurement to controller 450. Based on the measured current, controller 450 can decide whether to keep switching device 430 switched on or off. For example, if the measured current (which substantially equals to the current being supplied to LED 490) exceeds a threshold value, controller 450 can switch off switch 430, which cuts the supply of current to inductor 470, and forces inductor 470 to release the stored magnetic energy, convert it to current, and supply the current to LED 490, to maintain continuity of current through the inductor at the moment switch 430 is switched off. Since the amount of current supplied by an inductor depends on the magnetic energy stored, as the stored magnetic energy drops (as being used up to supply the current), the current supplied by the inductor also decreases. Controller 450 can detect the decreasing current through current sensor 440. As the current drops below the threshold value, controller 450 can switch on switching device 430 to let the DC signal supply the current to the inductor (and to LED 490) again. Since the on-time and off-time of switching device 430 can determine, respectively, the amount of energy being stored and released by the inductor, by using a feedback loop in which the controller adjusts the amount of on-time and off-time of switching device 430 based on the inductor current, a precise amount of output current to LED 490 can be achieved. Besides, with the amount of current provided to LED 490 being regulated by a feedback loop, the current becomes largely independent from the magnitude of the incoming AC signal or the current that comes with it, and can depend mostly on the threshold value used by the feedback loop.

In some embodiments, a second switching device 432 (as shown in FIG. 4) can be included in lighting driver 400. The second switching device 432 can also be controlled by controller 450, to ground the input side of inductor 470 (denoted by label A) when switching device 430 switches off. Such an arrangement can remove the residual charge in switching device 430 faster and can improve the responsiveness of the feedback loop.

In some embodiments, instead of having inductor 470 connecting between switching device 430 (via current sensor 440) and output filter 480, a transformer (not shown in FIG. 4), which includes a first inductor and a second inductor, can be used to magnetically couple the current through switching device 430 to the output filter. In this case, the first inductor of the transformer is electrically coupled with switching device 430, and the second inductor is electrically coupled with output filter 480 via a diode. When switching device 430 is turned on, current can flow in the first inductor, generating a magnetic field, which can then be captured by the second doctor and stored as magnetic energy, while the diode can prevent the second inductor from supplying current to LED 490. As a result, the capacitor in output filter 480 supplies the current to LED 490. When switching device 430 is turned off, the magnetic energy stored in the second inductor can be dissipated as an electrical current, which can then charge up the capacitor in output filter 480, and to provide a current for LED 490. At the same time, the second inductor can also magnetically couple back to the first inductor (while switching device 430 is switched off) to cause a current flowing through current sensor 440, the current being indicative of the amount of current flowing through LED 490. Current sensor 440 can then measure the current and provide the information to controller 450. Controller 450 can then adjust the on-time and off-time of switching device 430 to control the current through LED 490. Such an arrangement can allow isolating the output load (which includes, for example, output filter 480 and LED 490) from the input AC signal, which can further stabilize the DC current supplied to LED 490.

Figure 5:
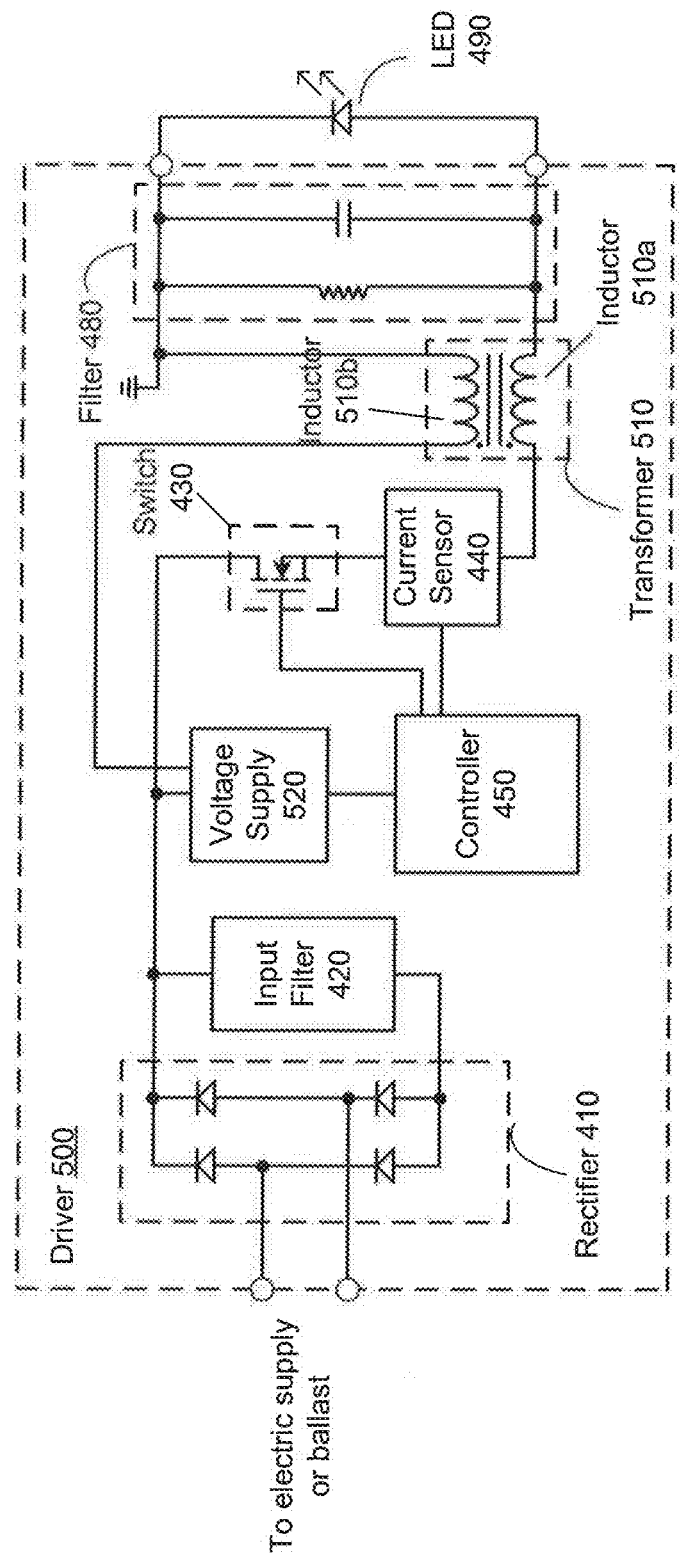
FIG. 5 is a detailed diagram illustrating another exemplary lighting driver, consistent with embodiments of the present disclosure.

FIG. 5 is a detailed diagram illustrating an exemplary lighting driver 500, consistent with embodiments of the present disclosure. As shown in FIG. 5, lighting driver 500 can include some components that are identical to those of light driver 400, such as rectifier 410, input filter 420, current sensor 440, controller 450, and output filter 480. Lighting driver 500 also includes a first inductor 510a, which is part of transformer 510 that connects between a switching device 430 (via current sensor 440) and output filter 480. The first inductor is magnetically coupled with a second inductor 510b, also of transformer 510, which can then supply a current to voltage supply 520, which can then supply power to controller 450. A benefit of such arrangement is to improve efficiency. In some embodiments where controller 450 operates at a much lower voltage than the rectified DC input voltage (which can be 110 V or 220 V), using resistors in voltage supply 520 to lower the voltage can be undesirable as resistors dissipate power, and huge amount of power can be wasted if controller 450 is to draw most of its power from the rectified DC input signal through the resistors. On the other hand, with the second inductor which can provide a second source of current to controller 450, it allows controller 450 to avoid drawing currents predominantly from the DC input signal through the resistors, and higher energy efficiency can be achieved.

Figure 6A:
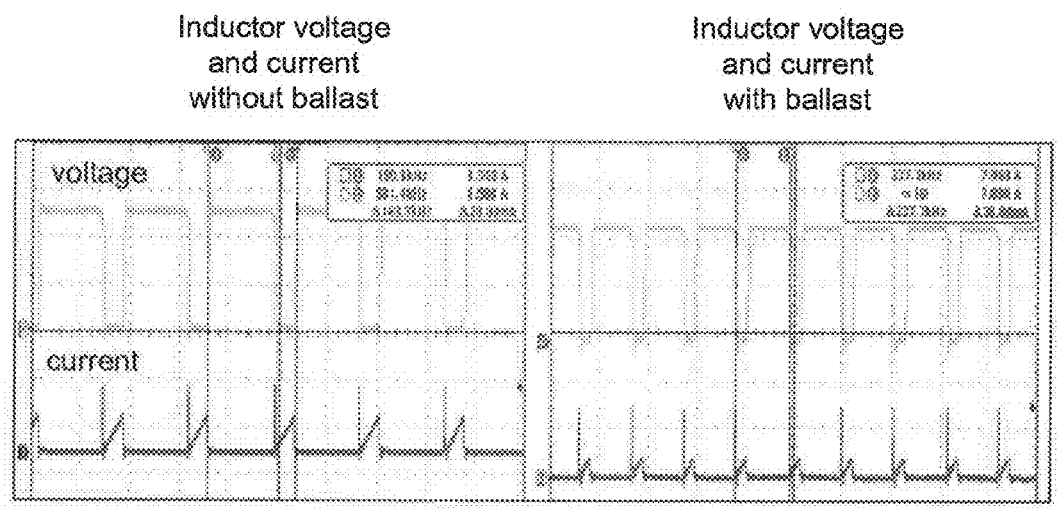
FIG. 6A illustrates a measurement of the inductor voltage and current measured in an exemplary lighting driver consistent with embodiments of the present disclosure, when the driver operates with and without ballast.

FIG. 6A illustrates a measurement of the inductor voltage and current measured in an exemplary lighting driver consistent with embodiments of the present disclosure, when the driver operates with and without ballast. In FIG. 6A, the graph on the left illustrates the voltage and current measured at, for example, node A of inductor 470 of FIG. 4, when the driver circuit (e.g. driver circuit 400 of FIG. 4) receives electricity directly from the electric supply, while the graph on the right illustrates the voltage and current measured at the same node A of inductor 470 when driver circuit 400 receives electricity from a ballast. As shown in FIG. 6A, the on/off-time of switch 430 (as revealed by the inductor voltage) is adjusted between the time the driver circuit operating with and without a ballast. Due to the change in on/off-time, the peak current through the inductor also changes.

Figure 6B:
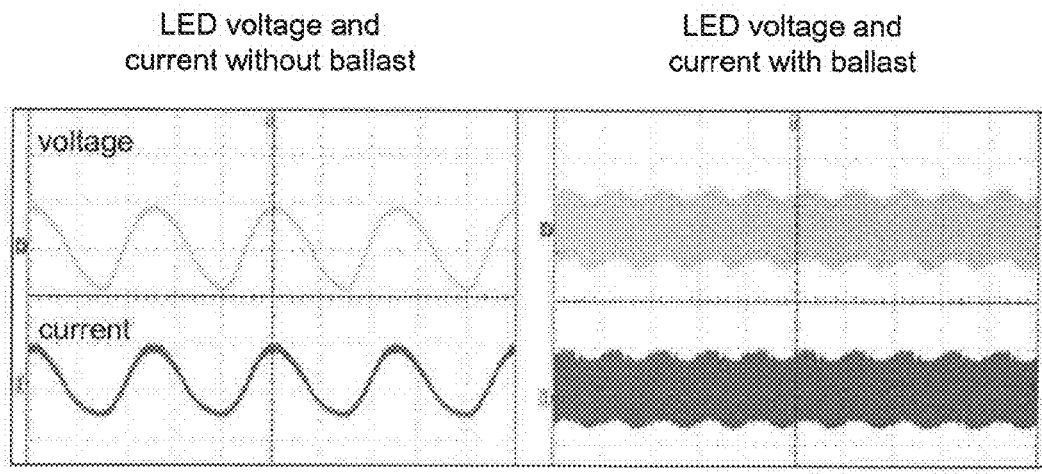
FIG. 6B illustrates a measurement of the voltage and current to LED devices as provided by an exemplary lighting driver consistent with embodiments of the present disclosure, when the driver operates with and without ballast.

FIG. 6B illustrates a measurement of the voltage and current to LED devices, as provided by an exemplary lighting driver consistent with embodiments of the present disclosure, when the driver operates with and without ballast. In FIG. 6B, the graph on the left illustrates the voltage and current measured across, for example, LED 490 of FIG. 4, when the driver circuit (e.g. driver circuit 400 of FIG. 4) receives electricity directly from the electric supply, while the graph on the right illustrates the voltage and current measured at LED 490 when driver circuit 400 receives electricity from a ballast. As shown in FIG. 6B, the average voltage and current supplied to the LED remain at a similar level, whether or not the driver circuit receives electricity through a ballast.

In the foregoing specification, embodiments have been described with reference to numerous specific details that can vary from implementation to implementation. Certain adaptations and modifications of the described embodiments can be made. Other embodiments can be apparent to those skilled in the art from consideration of the specification and practice of the invention disclosed herein. It is intended that the specification and examples be considered as exemplary only, with a true scope and spirit of the invention being indicated by the following claims. It is also intended that the sequence of steps shown in figures are only for illustrative purposes and are not intended to be limited to any particular sequence of steps. As such, those skilled in the art can appreciate that these steps can be performed in a different order while implementing the same apparatus or method.

In addition, well known power/ground connections to integrated circuit (IC) chips and other components may or may not be shown within the presented figures, for simplicity of illustration and discussion, and so as not to obscure the disclosure. Further, arrangements may be shown in block diagram form in order to avoid obscuring the disclosure, and also in view of the fact that specifics with respect to implementation of such block diagram arrangements are highly dependent upon the platform within which the present disclosure is to be implemented (i.e., such specifics should be well within purview of one skilled in the art). Where specific details (e. g., circuits) are set forth in order to describe example embodiments of the disclosure, it should be apparent to one skilled in the art that the disclosure can be practiced without, or with variation of, these specific details. The description is thus to be regarded as illustrative instead of limiting.

What is claimed:

1. An apparatus comprising:
    a transparent cover;
    a housing to form a first compartment with the transparent cover;
    one or more light emitting diodes disposed inside the first compartment; and
    a lighting driver module disposed inside the first compartment and electrically coupled with the one or more light emitting diodes, the lighting driver module comprising:
        a rectifier to convert an AC signal to a DC signal,
        a current sensor configured to measure current supplied to the one or more light emitting diodes and to provide information related to the measured current,
        a first switching device electrically coupled with the rectifier and with the one or more light emitting diodes, and being capable of interrupting or allowing a transmission of the DC signal to the one or more light emitting diodes,
        a controller to switch on or off the switching device to allow or interrupt, respectively, the transmission of the DC signal to the one or more light emitting diodes, based on the information provided by the current sensor, and a first inductor and a second inductor, the second inductor being magnetically coupled with the first inductor, wherein the second inductor supplies an electric current to the controller.

2. The apparatus of claim 1, wherein the first inductor includes a first end and a second end, the first end being electrically coupled with the first switching device and the second end being electrically coupled with the one or more light emitting diodes, wherein the first inductor supplies an electric current to the one or more light emitting diodes when the first switching device is switched off.

3. The apparatus of claim 2, wherein the lighting driver module further includes an output filter, the output filter being electrically coupled with the first inductor and with the one or more light emitting diodes, wherein the output filter controls a ripple in a DC signal being supplied to the one or more light emitting diodes within a pre-determined range.

4. The apparatus of claim 2, wherein the controller compares the measured current with a target current value, and adjusts a first duration when the first switching device is switched on and adjusts a second duration when the first switching device is switched off, based on a result of the comparison.

5. The apparatus of claim 1, wherein the lighting driver module further includes a second switching device, the second switching device being capable of electrically coupling a first end of the fat inductor with ground when being switched on, and wherein the controller is further configured to switch on the second switching device when the first switching device is switched off, and to switch off the second switching device when the first switching device is switched on.

6. The apparatus of claim 1, wherein the lighting driver module further includes:
an output diode; and
an output capacitor,
wherein:
the first inductor is magnetically coupled with the second inductor,
the first inductor is electrically coupled with the first switching device,
the second inductor is electrically coupled with the one or more light emitting diodes via the output diode,
the output capacitor is electrically coupled with the one or more light emitting diodes, and
the output diode is configured to interrupt a current flow from the second inductor to the one or more light emitting diodes when the first switching device is switched on.

7. The apparatus of claim 1, further including a platform to divide the first compartment into a second compartment and a third compartment, the second compartment being surrounded by the transparent cover and the platform, and the third compartment being enclosed by the platform and the housing, wherein the one or more light emitting diodes are posited on the platform.

8. The apparatus of claim 7, wherein the platform further includes a trench, and wherein the one or more light emitting diodes are mounted on a plate posited on a bottom side of the trench.

9. The apparatus of claim 8, wherein the transparent cover further includes one or more transparent protrusions configured to press the plate against the platform.

10. The apparatus of claim 8, wherein the plate includes a printed circuit broad to supply electric current to the one or more light emitting diodes.

11. The apparatus of claim 8, wherein the one or more light emitting diodes are detachably mounted onto the plate.

12. The apparatus of claim 7, wherein the platform is posited below a center of the first compartment.

13. The apparatus of claim 1, further comprising one or more caps, each cap being fitted over and enclosing one end of the transparent cover and one end of the housing, wherein the at least one of the one or more caps further comprises one or more first connectors, the one or more first connectors being configured to transmit the AC signal to the lighting driver module.

14. The apparatus of claim 13, wherein the lighting driver module further comprises one or more second connectors corresponding to the one or more first connectors, and wherein the lighting driver module is fixedly mounted into at least one of the one or more caps by fixedly connecting each of the first connectors with each of the corresponding second connectors.

15. The apparatus of claim 13, wherein the at least one of the one or more caps further includes a switch, the switch being capable of interrupting the transmission of the AC signal to the lighting driver module.

16. An apparatus comprising:
a transparent cover;
a housing to form a first compartment with the transparent cover;
one or more light emitting diodes disposed inside the first compartment; and
a lighting driver module disposed inside the first compartment and electrically coupled with the one or more light emitting diodes, the lighting driver module comprising:
a rectifier to convert an AC signal to a DC signal,
a current sensor configured to measure current supplied to the one or more light emitting diodes and to provide information related to the measured current,
a first switching device electrically coupled with the rectifier and with the one or more light emitting diodes, and being capable of interrupting or allowing a transmission of the DC signal to the one or more light emitting diodes,
a controller to switch on or off the switching device to allow or interrupt, respectively, the transmission of the DC signal to the one or more light emitting diodes, based on the information provided by the current sensor, and
a second switching device, the second switching device being capable of electrically coupling a first end of a first inductor with ground when being switched on, and wherein the controller is further configured to switch on the second switching device when the first switching device is switched off, and to switch off the second switching device when the first switching device is switched on.

* * * * *